US009577755B2

(12) United States Patent
Jovicic et al.

(10) Patent No.: US 9,577,755 B2
(45) Date of Patent: Feb. 21, 2017

(54) METHODS AND APPARATUS FOR EFFICIENT JOINT POWER LINE AND VISIBLE LIGHT COMMUNICATION

(71) Applicant: QUALCOMM Incorporated, San Diego, CA (US)

(72) Inventors: Aleksandar Jovicic, Jersey City, NJ (US); Junyi Li, Chester, NJ (US); Thomas Joseph Richardson, South Orange, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/164,108

(22) Filed: May 25, 2016

(65) Prior Publication Data

US 2016/0269113 A1    Sep. 15, 2016

Related U.S. Application Data

(62) Division of application No. 14/826,279, filed on Aug. 14, 2015, now Pat. No. 9,391,699, which is a division
(Continued)

(51) Int. Cl.
*H04B 10/116* (2013.01)
*H04B 10/50* (2013.01)
(Continued)

(52) U.S. Cl.
CPC .............. *H04B 10/116* (2013.01); *H04B 3/46* (2013.01); *H04B 3/542* (2013.01);
(Continued)

(58) Field of Classification Search
None
See application file for complete search history.

(56) References Cited

U.S. PATENT DOCUMENTS

| 7,349,325 B2 | 3/2008 | Trzeciak et al. |
| 7,583,901 B2 | 9/2009 | Nakagawa et al. |

(Continued)

FOREIGN PATENT DOCUMENTS

| CN | 102577180 A | 7/2012 |
| CN | 102812783 A | 12/2012 |

(Continued)

OTHER PUBLICATIONS

IPEA/EPO, Second Written Opinion of the International Preliminary Examining Authority, Int'l Appl. No. PCT/US2014/016002, Jan. 16, 2015, European Patent Office, Munich, DE, 5 pgs.
(Continued)

*Primary Examiner* — Shi K Li
*Assistant Examiner* — Mina Shalaby
(74) *Attorney, Agent, or Firm* — Holland & Hart LLP

(57) ABSTRACT

A hybrid communications system implements different communication technologies to communicate data and information for particular communications directions in different portions of the system. Power line communications (PLC) signaling is used to deliver data and information from a gateway device to a light access point. Visible light communications (VLC) signaling is used to communicate data and information from the light access point to a user equipment (UE) device. Wireless radio signaling, wireless infrared (IR) signaling, or a combination of wireless IR signaling and PLC signaling is used to communicate data/information from the UE device to the gateway device. To efficiently control the VLC communications channel between the light access point and UE device, the UE device measures the VLC channel, e.g., calculating SNRs on a per VLC tone basis, and communicating VLC channel quality feedback information to the gateway device, which is forwarded to the light access point.

20 Claims, 11 Drawing Sheets

Related U.S. Application Data of application No. 13/767,681, filed on Feb. 14, 2013, now Pat. No. 9,166,683.

(51) Int. Cl.

| | | |
|---|---|---|
| *H04B 10/516* | (2013.01) | |
| *H04L 12/66* | (2006.01) | |
| *H04L 5/00* | (2006.01) | |
| *H04B 10/11* | (2013.01) | |
| *H04B 3/54* | (2006.01) | |
| *H04B 10/079* | (2013.01) | |
| *H04B 3/46* | (2015.01) | |
| *H04B 10/564* | (2013.01) | |
| *H04B 10/114* | (2013.01) | |

(52) U.S. Cl.
CPC ....... *H04B 10/07953* (2013.01); *H04B 10/11* (2013.01); *H04B 10/1143* (2013.01); *H04B 10/1149* (2013.01); *H04B 10/502* (2013.01); *H04B 10/516* (2013.01); *H04B 10/564* (2013.01); *H04L 5/0057* (2013.01); *H04L 12/66* (2013.01)

(56) References Cited

U.S. PATENT DOCUMENTS

| | | | | |
|---|---|---|---|---|
| 7,684,502 | B2* | 3/2010 | Kurobe | H04L 1/0003 370/204 |
| 2004/0101312 | A1 | 5/2004 | Cabrera | |
| 2007/0099577 | A1* | 5/2007 | Lee | H04L 1/0026 455/69 |
| 2009/0003219 | A1 | 1/2009 | Beacham et al. | |
| 2009/0171571 | A1 | 7/2009 | Son et al. | |
| 2009/0185802 | A1 | 7/2009 | Choi et al. | |
| 2010/0188004 | A1 | 7/2010 | Baggen et al. | |
| 2011/0026918 | A1 | 2/2011 | Kim et al. | |
| 2011/0069962 | A1 | 3/2011 | Castor et al. | |
| 2012/0001567 | A1 | 1/2012 | Knapp et al. | |
| 2012/0076509 | A1* | 3/2012 | Gurovich | H04B 10/60 398/212 |
| 2013/0051264 | A1* | 2/2013 | Wang | H04L 5/0098 370/252 |

FOREIGN PATENT DOCUMENTS

| | | |
|---|---|---|
| EP | 2525630 A1 | 11/2012 |
| WO | WO-2011125845 A1 | 10/2011 |

OTHER PUBLICATIONS

ISA/EPO, International Search Report and Written Opinion of the International Searching Authority, Int'l Appl. No. PCT/US2014/016002, Jun. 26, 2014, European Patent Office, Rijswijk, NL, 12 pgs.

Komine et al., "Integrated System of White LED Visible-Light Communication and Power-Line Communication," IEEE Transactions on Consumer Electronics, Feb. 2003, pp. 71-79, vol. 49, Issue 1, Institute of Electrical and Electronics Engineers.

Lee et al., "Optical Wireless Sensor Networks Based on VLC with PLC-Ethernet Interface," World Academy of Science, Engineering and Technology, Year 2011, pp. 245-248.

Vucic et al., "513 Mbit/s Visible Light Communications Link Based on DMT-Modulation of a White LED," Journal of Lightwave Technology, Oct. 25, 2010, pp. 3512-3518, vol. 28, Issue 24, Institute of Electrical and Electronics Engineers.

* cited by examiner

METHODS AND APPARATUS FOR EFFICIENT JOINT POWER LINE AND VISIBLE LIGHT COMMUNICATION

CROSS REFERENCES

The present application for patent claims priority to and is a divisional application of U.S. patent application Ser. No. 14/826,279, by Jovicic et al., entitled, "Methods and Apparatus for Efficient Joint Power Line and Visible Light Communication," filed Aug. 14, 2015, which claims priority to and is a divisional application of U.S. patent application Ser. No. 13/767,681 by Jovicic et al., entitled "Methods and Apparatus for Efficient Joint Power Line and Visible Light Communication," filed Feb. 14, 2013, each of which is assigned to the assignee hereof.

FIELD

Various embodiments are related to the communication of data and information, and more particularly, to efficiently communicate data and information using power line communications in combination with visible light communications.

BACKGROUND

Light Emitting Diodes (LEDs) capable of generating white light are projected to become the dominant source of lighting in the commercial and residential sectors in the future. Recent research has demonstrated that such LEDs can be intensity modulated at a high bandwidth. When combined with the high optical power intensities (tens of Watts) in typical indoor lighting conditions, the high modulation rate offers the potential for broadband wireless data communication in the hundreds of Mbps.

There are various challenges to enabling Visible Light Communication (VLC): (i) the absence of a native reverse link; and (ii) a backhaul to deliver data to the LED light. Without an adequate reserve link suitable for communicating feedback information, it is difficult to efficiently utilize the forward link including the VLC communications.

Based on the above discussion, there is a need for new methods and apparatus to efficiently deliver data to an LED device. It would also be advantageous if new methods and apparatus were developed to support efficient VLC communications from the LED device to user equipment (UE) devices.

SUMMARY

A hybrid communications system implements different communication technologies to communicate information for particular communications directions in different portions of the system. Power line communications (PLC) signaling is used to deliver data and information from a gateway device to a light access point. Visible light communications (VLC) signaling is used to communicate data and information from the light access point to a user equipment (UE) device. Wireless radio signaling, wireless infrared (IR) signaling, or a combination of wireless IR signaling and PLC signaling is used to communicate data/information from the UE device to the gateway device.

To efficiently control the VLC communications channel between the light access point and UE device, the UE device measures the VLC channel, e.g., calculating SNRs on a per VLC tone basis, and communicating VLC channel quality feedback information to the gateway device, which is forwarded to the light access point. In some embodiments, to efficiently control the PLC communications channel between the gateway device and the light access point, the light access point measures the PLC channel, e.g., calculating SNRs on a per PLC tone basis, and communicating PLC channel quality feedback information to the UE device, which is forwarded to the gateway device.

An exemplary method of operating user equipment (UE) device, in accordance with some embodiments, includes receiving a light signal from an access point communicating information to the UE, said signal including at least some data from a gateway device which supplied said data to the access point via a power line communications link, and communicating feedback information from said UE device to the gateway device via a communications channel which includes a wireless uplink, said feedback information communicating visible light communications (VLC) channel quality information. An exemplary user equipment (UE) device, in accordance with some embodiments, includes at least one processor configured to: receive a light signal from an access point communicating information to the UE, said signal including at least some data from a gateway device which supplied said data to the access point via a power line communications link, and communicate feedback information from said UE device to the gateway device via a communications channel which includes a wireless uplink, said feedback information communicating visible light communications (VLC) channel quality information. The exemplary UE device further includes memory coupled to said at least one processor.

An exemplary method of operating a light access point, in accordance with some embodiments, includes: decoding received encoded information to recover information to be communicated to a user equipment device; encoding the recovered information as a function of light channel quality information to generate re-encoded information; and transmitting the re-encoded information via a visible light communications (VLC) channel to the user equipment device. An exemplary light access point, in accordance with some embodiments, includes at least one processor configured to: decode received encoded information to recover information to be communicated to a user equipment device; encode the recovered information as a function of light channel quality information to generate re-encoded information; and transmit the re-encoded information via a visible light communications (VLC) channel to the user equipment device. The exemplary light access point further includes memory coupled to said at least one processor.

An exemplary method of operating a power line communications (PLC) gateway device including a wireless interface, in accordance with some embodiments, includes: receiving via said wireless interface channel quality feedback information including VLC channel quality information from a user equipment device; and transmitting, via a power line, said VLC channel quality information to a light access point in light communication with said UE device, said VLC channel quality information being based on prior VLC transmissions from the light access point to the UE device. An exemplary power line communications (PLC) gateway device including a wireless interface, in accordance with some embodiments, includes at least one processor configured to: receive via said wireless interface channel quality feedback information including VLC channel quality information from a user equipment device; and transmit, via a power line, said VLC channel quality information to a light access point in light communication with said UE device, said VLC channel quality information being based on prior VLC transmissions from the light access point to the UE device. The exemplary PLC gateway device further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
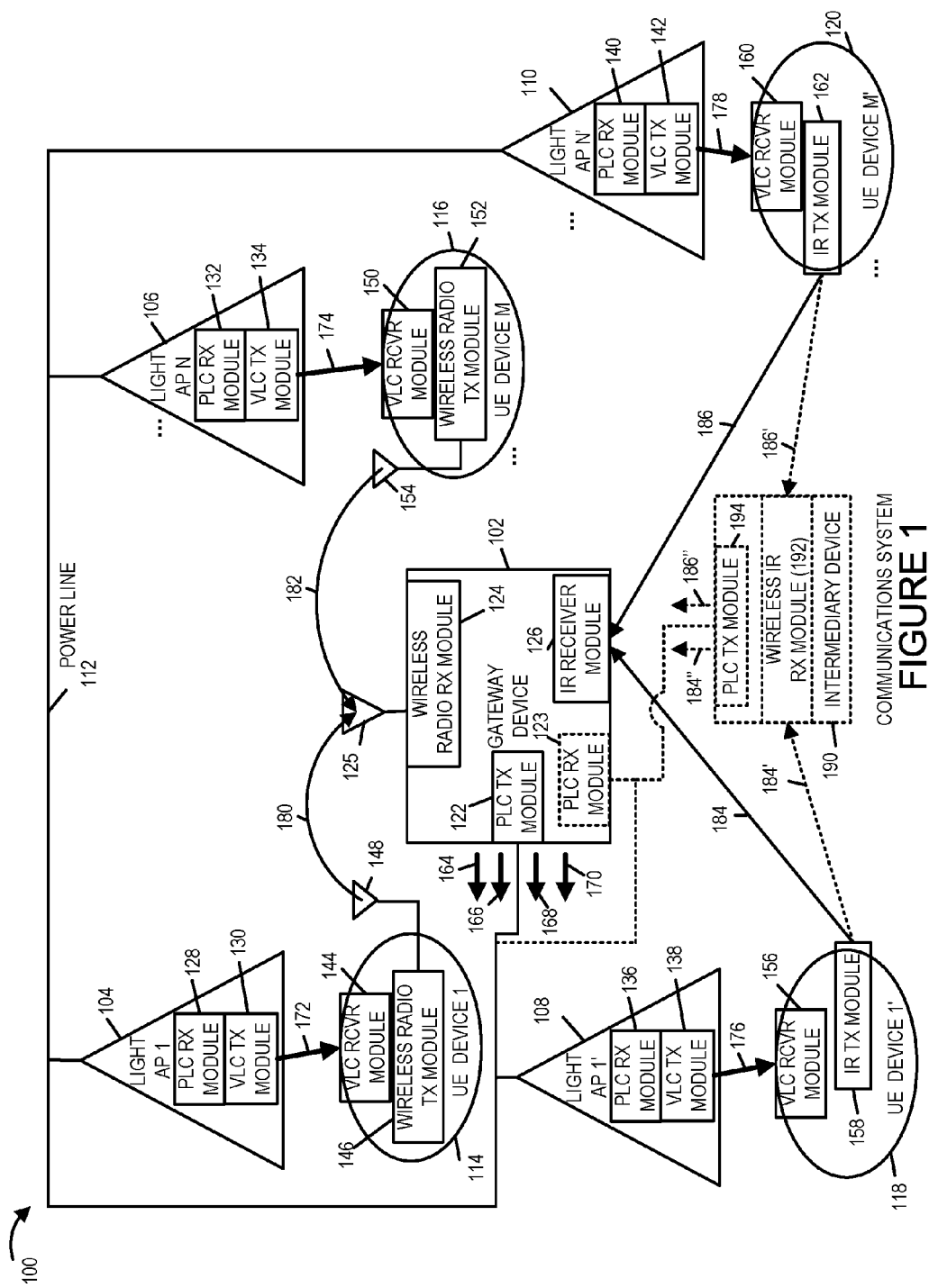
FIG. 1 is a drawing of an exemplary communications system in accordance with an exemplary embodiment.

FIG. 1 is a drawing of an exemplary communications system 100 in accordance with various embodiments. Exemplary communications system 100 includes a gateway device 102, a plurality of light access points (light access point (AP) 1 104, . . . , light AP N 106, light AP 1' 108, . . . , light AP N' 110). The gateway device 102 is coupled to the light APs (104, . . . , 106, 108, . . . , 110) via a power line 112. Gateway device 102 includes a power line communications (PLC) transmit module 122 coupled to power line 112. In some embodiments, gateway device 102 further includes a PLC receiver module 123 coupled to power line 112. Each of the light APs (104, . . . , 106, 108, . . . , 110) includes a power line communications receive module (128, . . . , 132, 136, . . . , 140), respectively, which are coupled to the power line 112. PLC TX module 122 of gateway device 102 transmits PLC signals (164, 166, 168, 170) to light access points (104, 106, 108, 110), respectively. Signals corresponding to the transmitted signals (164, 166, 168, 170), are received by the PLC receiver modules (128, 132, 136, 140), respectively. Light APs (104, 106, 108, 110) include a VLC transmit module (130, 134, 138, 142), respectively for transmitting VLC signals to UE devices within its coverage area.

Exemplary system 100 further includes a plurality of user equipment (UE) devices (UE device 1 114, . . . , UE device M 116, UE device 1' 118, . . . , UE device M' 120), e.g., mobile wireless terminals, which may move throughout the system 100. The UE devices (114, . . . , 116, 118, . . . , 120) include the capability to receive visible light communications (VLC) signals and transmit at least one of wireless radio signals or wireless IR signals. In some embodiments, at least some UE devices include the capability to transmit both wireless radio signals and wireless IR signals. UE devices (114, 116, 118, 120) include a VLC receiver module (144, 150, 156, 160), respectively, for receiving VLC light signals transmitted from light access points. UE device 1 114 and UE device M 116 include a wireless radio transmitter module (146, 152), respectively, for transmitting wireless uplink radio signals to wireless radio receiver module 124 of gateway 102. UE device 1' 118 and UE device M' 120 include an IR transmitter module (158, 162), respectively, for transmitting wireless uplink IR signals to IR receiver module 126 of gateway device 102.

VLC TX modules transmit VLC (130, 134, 138, 142) of light access points (104, 106, 108, 110) transmit VLC signals (172, 174, 176, 178); UE devices (114, 116, 118, 120) receive VLC signals corresponding to the transmitted signals (172, 174, 176, 178), respectively. Wireless radio transmitter modules (146, 152) of UE devices (114, 116) transmit uplink wireless radio signals (180, 182) via antennas (148, 154), respectively. Signals corresponding to wireless radio signal (180, 182) are received by wireless radio receiver module 124 of gateway device 102 via antenna 125. IR transmitter modules (158, 162) of UE devices (118, 120) transmit uplink IR signals (184, 186). Signals corresponding to wireless IR signals (184, 186) are received by IR receiver module 126 of gateway device 102.

There is a PLC communications channel between gateway device 102 and light AP 1 104. There is also a PLC communications channel between gateway device 102 and light AP N 106. Similarly, there is a PLC communications channel between gateway device 102 and light AP 1' 108. In addition, there is a PLC communications channel between gateway device 102 and light access point N' 110.

There is a VLC communications channel between light AP 1 104 and UE device 1 114; there is a VLC communications channel between light AP N 106 and UE device M 116; there is a VLC communications channel between light AP 1' 108 and UE device 1' 118; there is a VLC communications channel between light AP N' 110 and UE device M' 120.

A wireless radio communications channel exists between UE device 1 114 and gateway device 102; a wireless radio communications channel exists between UE device M 116 and gateway device 102. A wireless IR communications channel exists between UE device 1' 118 and gateway device 102; a wireless IR communications channel exists between UE device M' 120 and gateway device 102.

In exemplary system 100, a forward communications link between gateway device 102 and a UE device includes a PLC communications link and a VLC communications link. In exemplary system 100, a reverse communications link between gateway device 102 and a UE device includes a wireless radio communications link or a wireless IR communications link.

Signal 180 communicates channel quality feedback information corresponding to the VLC communications channel between light AP 1 104 and UE device 1 114. Signal 182 communicates channel quality feedback information corresponding to the VLC communications channel between light AP N 106 and UE device M 116. Signal 184 communicates channel quality feedback information corresponding to the VLC communications channel between light AP 1' 108 and UE device 1' 118. Signal 186 communicates channel quality feedback information corresponding to the VLC communications channel between light AP N' 110 and UE device M' 120.

Signals (172, 174, 176, 178) include, e.g., traffic data signals and pilot signals. In some embodiments, signals (172, 174, 176, 178) further include channel quality feedback information corresponding to PLC communications channels (PLC communications channel between gateway device 102 and light AP 1 104, PLC communications channel between gateway device 102 and light AP N 106, PLC communications channel between gateway device 102 and light AP 1' 108, PLC communications channel between gateway device 102 and light AP N' 110), respectively. In some such embodiments, PLC communications channel information received in forward link signals (172, 174, 176, 178) is included in reverse link signals (180, 182, 184, 186), respectively.

PLC signals (164, 166, 168, 170) communicate, e.g., PLC pilot signals, traffic data signals, and channel quality feedback information corresponding to a VLC communications channel.

In some embodiments, PLC feedback information is on a per PLC carrier basis, e.g., per PLC tone basis. In some embodiments, VLC feedback information is on a per VLC carrier basis, e.g., per VLC tone basis. In various embodiments, the light access points (104, 106, 108, 110) do not include a PLC transmit capability, e.g., to reduce complexity and/or cost.

In some embodiments, communications system 100 further includes an intermediary device 190 which includes a wireless IR receiver module 192 and a PLC transmitter module 194. As an alternative to UE devices (118, 120) transmitting IR signals (184, 186) directly to gateway device 102, the UE devices (118, 120) transmit IR signals (184', 186') to the wireless IR receiver module 192 of intermediary device 190. The intermediary device 190 converts data/information, e.g., VLC and PLC feedback information, received in IR signals (184', 186') into PLC signals (184", 186"), and the PLC transmitter module 194 transmits PLC signals (184", 186"), onto power line 112, which are received and processed by PLC receiver module 123 of gateway device 102.

Figure 2:
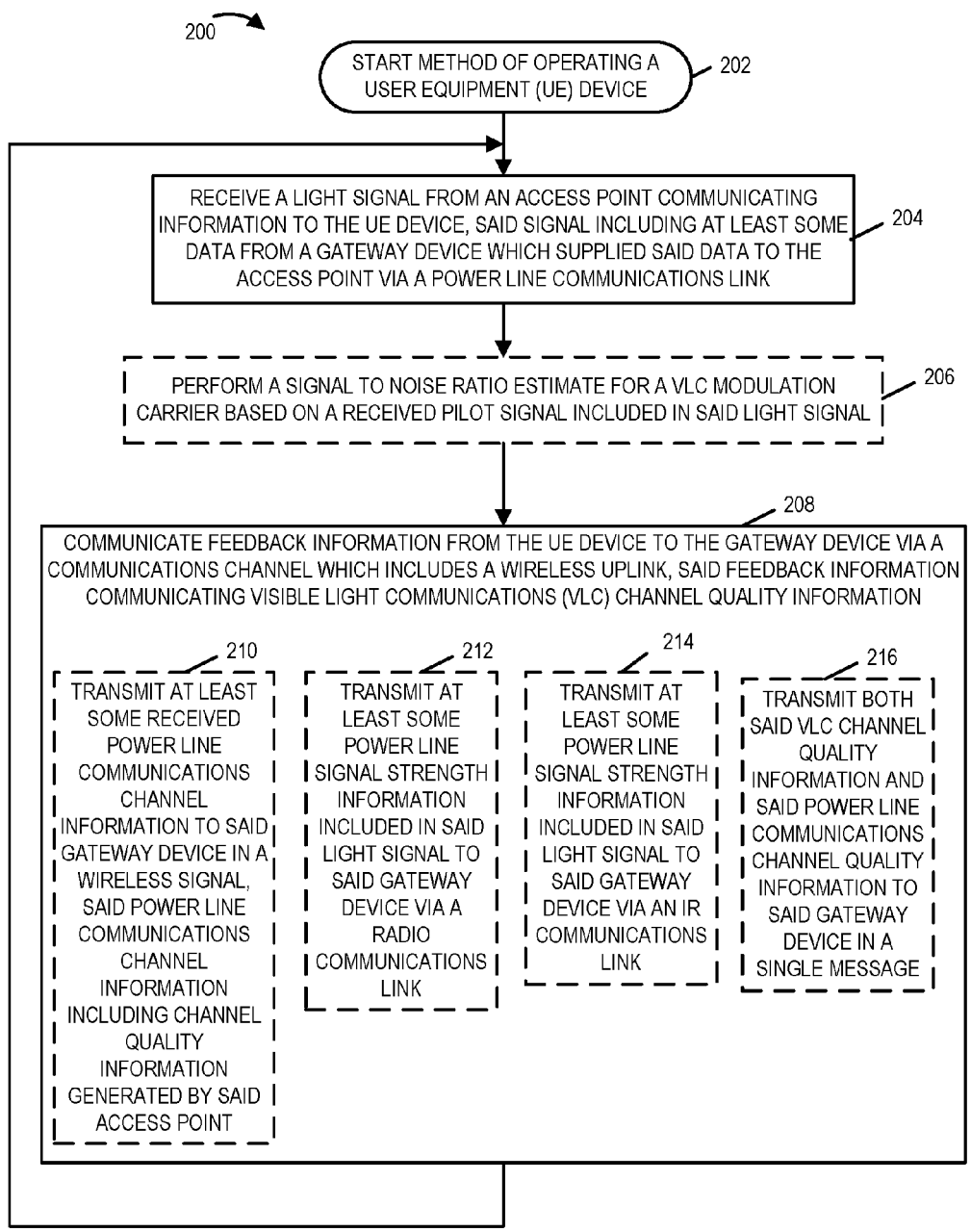
FIG. 2 is a flowchart of an exemplary method of operating a user equipment (UE) device in accordance with various exemplary embodiments.

FIG. 2 is a flowchart 200 of an exemplary method of operating a user equipment (UE) device in accordance with various exemplary embodiments. The UE device is, e.g., one of the UE devices (114, . . . , 116, 118, . . . , 120) of system 100 of FIG. 1 or UE device 1106 of FIG. 11. Operation of the exemplary method starts in step 202 where the UE device is powered on and initialized. Operation proceeds from step 202 to step 204, in which the UE device receives a light signal from an access point communicating information to the UE device, said signal including at least some data from a gateway device which supplied data to the access point via a power line communications link.

In some embodiments, the access point includes a power line communications receiver but does not include a power line communications transmitter. In various embodiments, the received light signal includes power line communications channel information about a power line channel extending from the gateway device to said access point. In some such embodiments, the power line communications channel information includes an SNR channel estimate of the power line communications channel.

In some embodiments, operation proceeds from step 204 to step 208; in other embodiments, operation proceeds from step 204 to step 206.

In step 206, the UE device performs a signal to noise ratio (SNR) estimate for a visible light communications (VLC) modulation carrier based on the received pilot signal included in said light signal. Operation proceeds from step 206 to step 208.

In step 208, the UE device communicates feedback information from the UE device to the gateway device via a communications channel which includes a wireless uplink, said feedback information communicating visible light communications (VLC) channel quality information. In some embodiments, the VLC channel quality information provides information on the quality of a light channel used to communicate said light signal from the access point to the UE device. In some embodiments, the feedback information is based on said estimated signal to noise ratio. In various embodiments, the feedback information includes SNR information on a per light channel modulation carrier basis for each of a plurality of light channel modulation carriers used to communicate said light signal. In some embodiments, the feedback information includes a suggested modulation carrier size, e.g., a 4, 16 or 64 symbol constellation, or a suggested coding rate to be used by the access point during future VLC transmissions. In some embodiments, the feedback information includes both a suggested modulation carrier size and a suggested coding rate. In some embodiments, the wireless uplink is one of a radio communications uplink and an Infrared (IR) communications uplink.

In some embodiments, step 208 includes one or more or all of steps 210, 212, 214, and 216. In step 210, the UE device transmits at least some received power line communications channel information to said gateway device in a wireless signal, said power line communications channel information including channel quality information generated by said access point. In various embodiments, the received light signal includes information indicating power line signal strength at the access point. In step 212, the UE device transmits at least some power line signal strength information included in said light signal to said gateway device via a radio communications link. In some embodiments, the radio communication link is a WiFi communications link. In step 214, the UE device transmits at least some power line signal strength information included in said light signal to said gateway device via an IR communications link. In step 216, the UE device transmits both said VLC channel quality information and said power line communications channel quality information to said gateway device in a single message. In some such embodiments, the VLC channel quality information and power line channel quality information are jointly coded in a single message.

In some embodiments, the feedback information communicated from the UE device to the gateway includes both VLC channel quality information and power line channel quality information and the VLC channel quality information is communicated a different rate than the rate at which the power line channel quality information is communicated, e.g., first and second predetermined rates. In some embodiments, the rate at which channel quality feedback information is communicated is a function of the rate of detected variation of the channel quality feedback information.

Operation proceeds from step 208 to step 204, in which the UE device receives another light signal from the access point.

Figure 3:
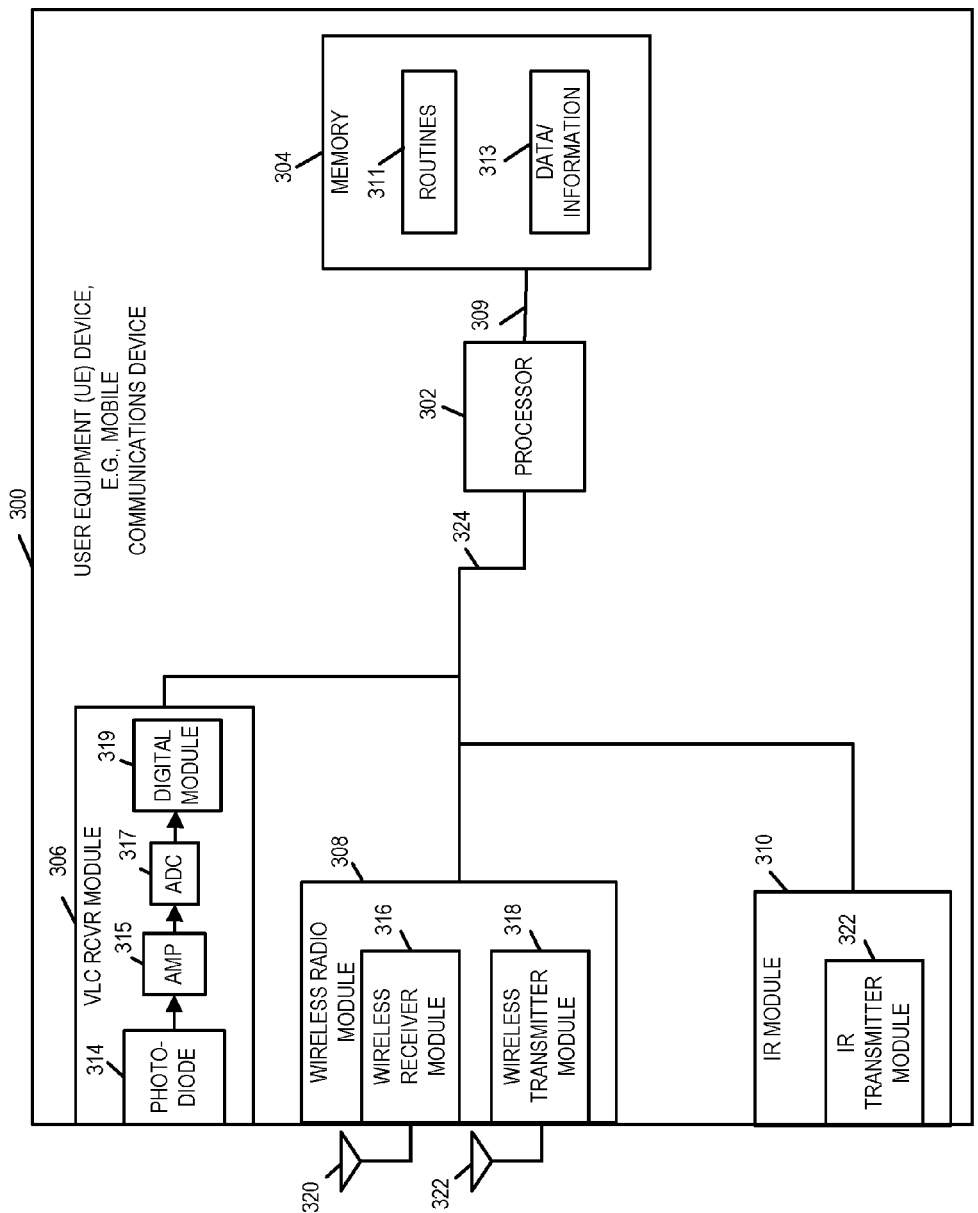
FIG. 3 is a drawing of an exemplary user equipment (UE) device in accordance with various exemplary embodiments.

FIG. 3 is a drawing of an exemplary user equipment (UE) device 300, e.g., a mobile wireless communications device, in accordance with an exemplary embodiment. The UE device 300 is, e.g., one of the UE devices (114, . . . , 116, 118, . . . , 120) of system 100 of FIG. 1 or UE device 1106 of system 1100 of FIG. 11. In some embodiments, UE device 300 implements a method in accordance with flowchart 200 of FIG. 2.

UE device 300 includes a processor 302 and memory 304 coupled together via a bus 309 over which the various elements (302, 304) may interchange data and information. Memory 304 includes routines 311 and data/information 313. UE device 300 further includes a visible light communications (VLC) receiver module 306, a wireless radio module 308, and an infrared (IR) module 310. The VLC receiver module 306, wireless radio module 308, and IR module 310 are coupled to processor 302 via bus 324.

VLC receiver module 306 includes a photodiode 314, an amplifier 315, an analog to digital converter (ADC) 317, and a digital module 319. Visible light signals detected by photodiode 314 are amplified by amplifier 315, and the amplified analog signal is processed by ADC 317 resulting in a digital signal communicating information which is received and processed by digital module 319.

Wireless radio module 308 includes a wireless receiver module 316, e.g., a WiFi receiver, coupled to receive antenna 320, via which UE device 300 receives downlink radio signals. Wireless radio module 308 further includes a wireless transmitter module 318, e.g., a WiFi transmitter, coupled to transmit antenna 322, via which UE device 300 transmits uplink radio signals. In some embodiments, the same antenna is used for downlink and uplink. In some embodiments, the wireless transmitter module 318 transmits wireless radio signals communicating feedback information including VLC channel quality feedback information, corresponding to VLC communications between a light access point and UE device 300, to a gateway device. In some embodiments, the feedback information further includes PLC channel quality information corresponding to PLC communications between the gateway device and the light access point.

IR module 310 includes an IR transmitter module 322. In some embodiments, the IR transmitter module 322 transmits IR signals communicating feedback information including VLC channel quality feedback information, corresponding to VLC communications between a light access point and UE device 300, to a gateway device. In some embodiments, the feedback information further includes PLC channel quality information corresponding to PLC communications between the gateway device and the light access point.

In some embodiments, processor 302 is configured to: receive a light signal from an access point communicating information to the UE, said signal including at least some data from a gateway device which supplied said data to the access point via a power line communications link; and communicate feedback information from said UE device to the gateway device via a communications channel which includes a wireless uplink, said feedback information communicating visible light communications (VLC) channel quality information. In various embodiments, the VLC channel quality information provides information on the quality of a light channel used to communicate said light signal from the access point to the UE device.

In some such embodiments, processor 302 is further configured to perform a signal to noise ratio estimate for a VLC modulation carrier based on a received pilot signal included in said light signal.

In various embodiments, said feedback information is based on said estimated signal to noise ratio. In some embodiments, the feedback information includes SNR information on a per light channel modulation carrier basis for each of a plurality of light channel modulation carriers used to communicate said light signal. In some embodiments, the feedback information includes a suggested modulation constellation size, e.g., a 4, 16 or 64 symbol constellation or a suggested coding rate, e.g., from one of a plurality of predetermined coding rates, to be used by the access point during future VLC transmissions. In some embodiments, the feedback information includes both a suggested modulation constellation size, e.g., a 4, 16 or 64 symbol constellation and a suggested coding rate.

In some embodiments, said access point includes a power line communications receiver but does not include a power line communications transmitter. In various embodiments, the received light signal includes power line communications channel information providing information about a power line channel extending from the gateway device to said access point. In some such embodiments, said power line communications channel information includes an SNR channel estimate of the power line communications channel.

In some embodiments, processor 302 is configured to: transmit at least some received power line communications channel information to said gateway device in a wireless signal, said power line communications channel information including channel quality information generated by said access point, as part of being configured to communicate feedback information from said UE to the gateway device. In some embodiments, said received light signal includes information indicating power line signal strength at the access point. In various embodiments, processor 302 is configured to: transmit at least some power line signal strength information included in said light signal to said gateway device via a radio, e.g., a WiFi, communications link, as part of being configured to communicate information from said UE to the gateway device via a communications channel which includes a wireless uplink. In some embodiments, processor 302 is configured to: transmit at least some power line signal strength information included in said light signal to said gateway device via an IR communications link, as part of being configured to communicate information from said UE to the gateway device via a communications channel which includes a wireless uplink.

In some embodiments, processor 302 is configured to: transmit both said VLC channel quality information and said power line communications channel quality information to said gateway device in a single message, as part of being configured to communicate feedback information from said UE to the gateway device. In some such embodiments, the VLC channel quality information and power line communications channel quality information are jointly coded in a single message.

In various embodiments, processor 302 is configured to transmit VLC channel quality information in accordance with a predetermined schedule. In some embodiments, processor 302 is configured to transmit power line communications channel quality information in accordance with a predetermined schedule. In some embodiments, processor 302 is configured to transmit VLC channel quality information at a different rate than the rate used to transmit power line communications channel quality information. In various embodiments, processor 302 is configured to transmit VLC channel quality information at a rate which is a function of the rate of change of the VLC channel quality information. In various embodiments, processor 302 is configured to transmit power line communications channel quality information at a rate which is a function of the rate of change of the power line communications channel quality information.

Figure 4:
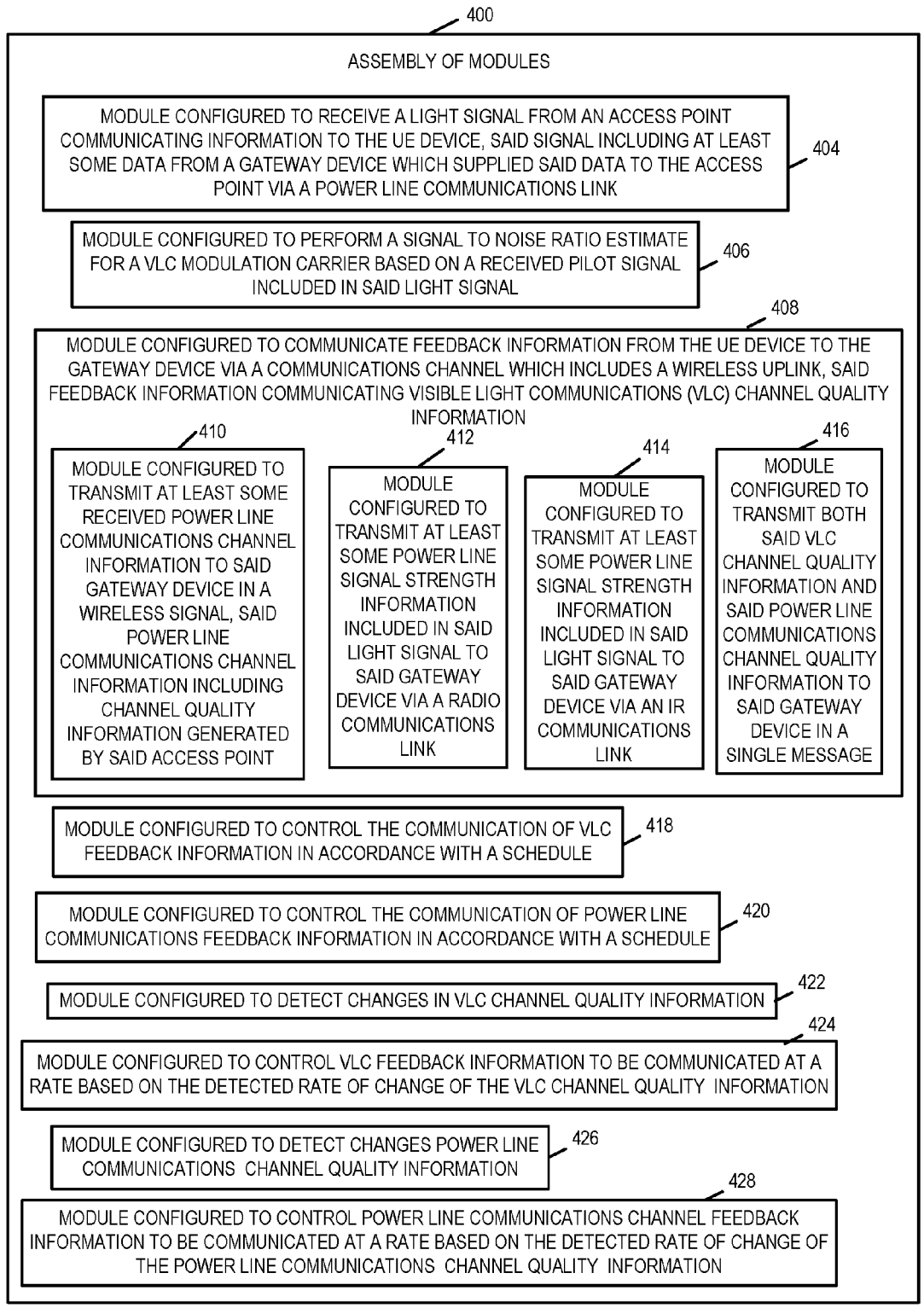
FIG. 4 is a drawing of an assembly of modules which may be included in the exemplary UE device of FIG. 3.

Referring to FIG. 4, assembly of modules 400 includes a module 404 configured to receive a light signal from an access point communicating information to the UE device, said signal including at least some data from a gateway device which supplied data to the access point via a power line communications link. In some embodiments, the access point includes a power line communications receiver but does not include a power line communications transmitter. In various embodiments, the received light signal includes power line communications channel information about a power line channel from the gateway device to said access point. In some such embodiments, the power line communications channel information includes an SNR channel estimate.

Assembly of modules 400 further includes a module 406 configured to perform a signal to noise ratio estimate for a VLC modulation carrier based on a received pilot signal included in said light signal, and a module 408 configured to communicate feedback information from the UE device to the gateway device via a communications channel which includes a wireless uplink, said feedback information communicating VLC channel quality information. In some embodiments, the VLC channel quality information provides information on the quality of a light channel used to communicate said light signal from the access point to the UE device.

In some embodiments, the feedback information is based on said estimated signal to noise ratio. In various embodiments, the feedback information includes SNR information on a per light channel modulation carrier basis for each of a plurality of light modulation carriers. In some embodiments, the feedback information includes a suggested modulation carrier size, e.g., a 4, 16 or 64 symbol constellation, or a suggested coding rate to be used by the access point during future VLC transmissions. In some embodiments, the feedback information includes both a suggested modulation carrier size and a suggested coding rate. In some embodiments, the wireless uplink is one of a radio communications uplink and an Infrared (IR) communications uplink.

In some embodiments, said received light signal includes information indicating power line signal strength at the access point. Module 408 includes a module 410 configured to transmit at least some received power line communications channel information to said gateway device in a wireless signal, said power line communications channel information including channel quality information generated by said access point, a module 412 configured to transmit at least some power line signal strength information included in said light signal to said gateway device via a radio communications link, e.g., a WiFi communications link, a module 414 configured to transmit at least some power line signal strength information included in said light signal to said gateway device via an IR communications link, and a module 416 configured to transmit both said VLC channel quality information and said power line communications channel quality information to said gateway device in a single message. In some such embodiments, the VLC channel quality information and power line channel quality information are jointly coded in a single message.

Assembly of modules 400 further includes a module 418 configured to control the communication of VLC feedback information in accordance with a schedule, e.g., a predetermined schedule, a module 420 configured to control the communication of power line communications feedback information in accordance with a schedule, e.g., a predetermined schedule, a module 422 configured to detect changes in VLC channel quality information, a module 424 configured to control VLC feedback information to be communicated at a rate based on the detected rate of change of the VLC channel quality information, a module 426 configured to detect changes in power line communications channel quality information, and a module 428 configured to control power line communications channel feedback information to be communicated at a rate based on the detected rate of change of the power line communications channel quality information.

Figure 5:
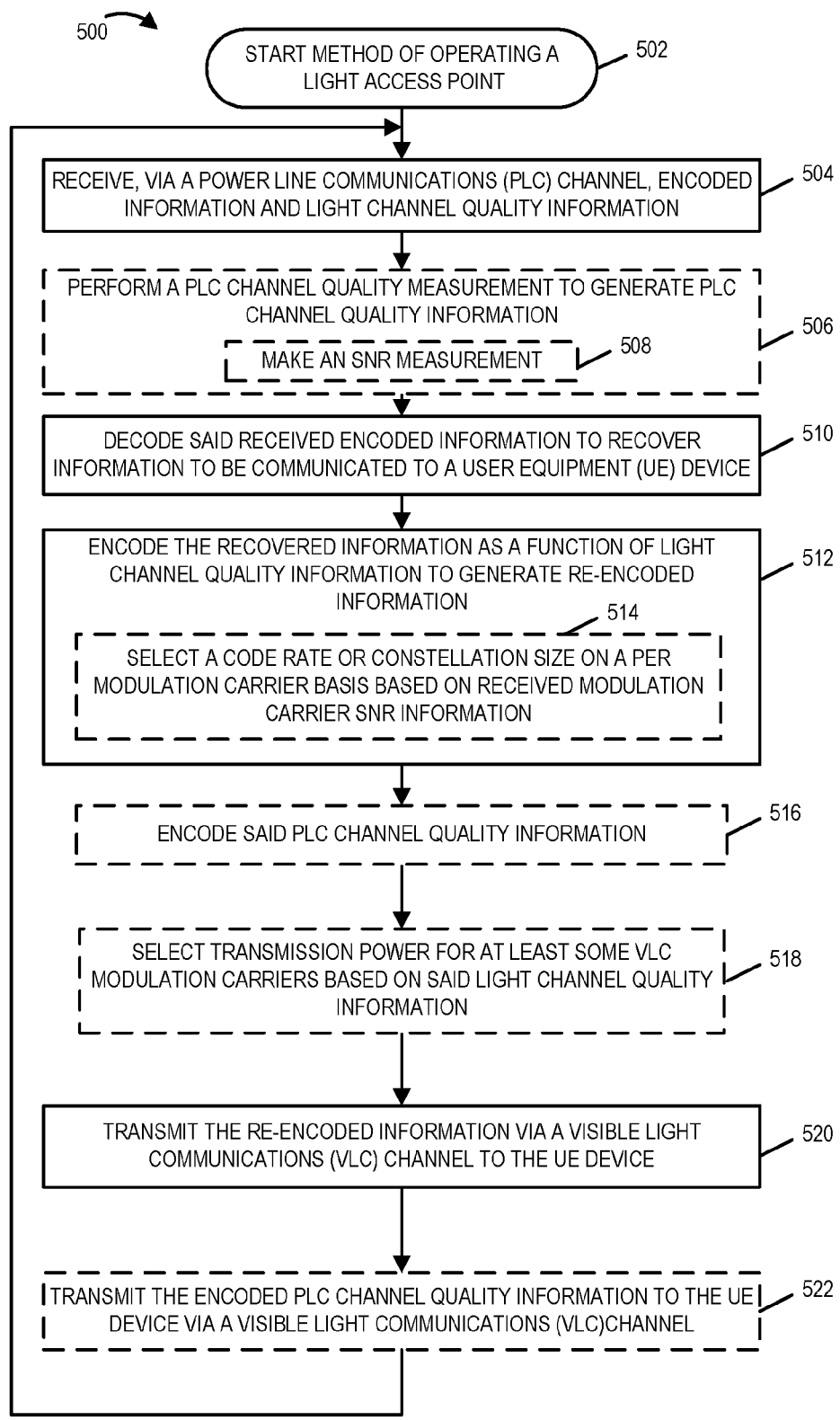
FIG. 5 is a flowchart of an exemplary method of operating a light access point in accordance with various exemplary embodiments.

FIG. 5 is a flowchart 500 of an exemplary method of operating a light access point in accordance with various exemplary embodiments. The light access point is, e.g., one or the light access points (104, . . . , 106, 108, . . . , 110) of system 100 of FIG. 1 or light access point 1104 of system 1100 of FIG. 11. Operation starts in step 502, where the light access point is powered on and initialized. Operation proceeds from step 502 to step 504. In step 504, the light access point receives, via a power line communications (PLC) channel, encoded information and light channel quality information. In some embodiments, the light channel quality information includes per VLC modulation carrier SNR information. In some embodiments, the light channel quality information is quality information about light signals previously transmitted by the light access point to a UE device, and the UE device generates the light channel quality information. In some embodiments, operation proceeds from step 504 to step 510. In some other embodiments, operation proceeds from step 504 to step 506.

In step 506, the light access point performs a PLC (power line communications) channel quality measurement to generate PLC channel quality information. In some such embodiments, step 506 includes step 508, in which the light access point makes an SNR measurement. In some embodiments, the PLC channel quality information includes an SNR value or information which is a function of an SNR value. Operation proceeds from step 508 to step 510.

In step 510, the light access point decodes the received encoded information to recover information to be communicated to a user equipment (UE) device. In some embodiments, the information to be communicated to a UE device includes data requested by the UE device, and the data may be consumed by a user of the UE device. For example, the information to be communicated to the UE device may be an e-mail message, a picture, music, etc. Operation proceeds from step 510 to step 512.

In step 512, the light access point encodes the recovered information as a function of light channel quality information to generate re-encoded information. The recovered information is re-encoded for the VLC channel so that the UE can reliably receive the information via the VLC channel. Since the PLC and VLC channels have different characteristics, they may use different types of encoding to ensure that the data is delivered reliably over the channel. In some embodiments, step 512 includes step 514 in which the light access point selects a code rate or constellation size on a per modulation carrier basis based on received modulation carrier SNR information. The received modulation carrier SNR information was received via the power line channel in step 504. In some embodiments, in step 514 the light access point selects both a code rate and constellation size on a per modulation carrier basis based on received modulation carrier SNR information.

Operation proceeds from step 512 to one of steps 516, 518 and 520 depending upon whether or not one or more of optional steps 516 and 518 are included.

In step 516, the light access point encodes the PLC channel quality information. Operation proceeds from step 516 to step 518. In step 518, the light access point selects transmission power for at least some VLC modulation carriers based on said light channel quality information. The light channel quality information, e.g., VLC channel quality feedback information on a per VLC modulation carrier basis, used to select the transmission power was previously received in step 504. In some embodiments, one or more lookup tables are used to determine coding, modulation, and carrier power on a per VLC carrier basis based on the received per carrier feedback information. Operation proceeds from step 518 to step 520.

In step 520, the light access point transmits the re-encoded information via a visible light communications (VLC) channel to the UE device. In some embodiments, operation proceeds from step 520 to step 504; in other embodiments, operation proceeds from step 520 to step 522. In step 522, the light access point transmits the encoded PLC channel quality information to the UE device via a visible light communications (VLC) channel. Operation proceeds from step 522 to step 504.

Figure 6:
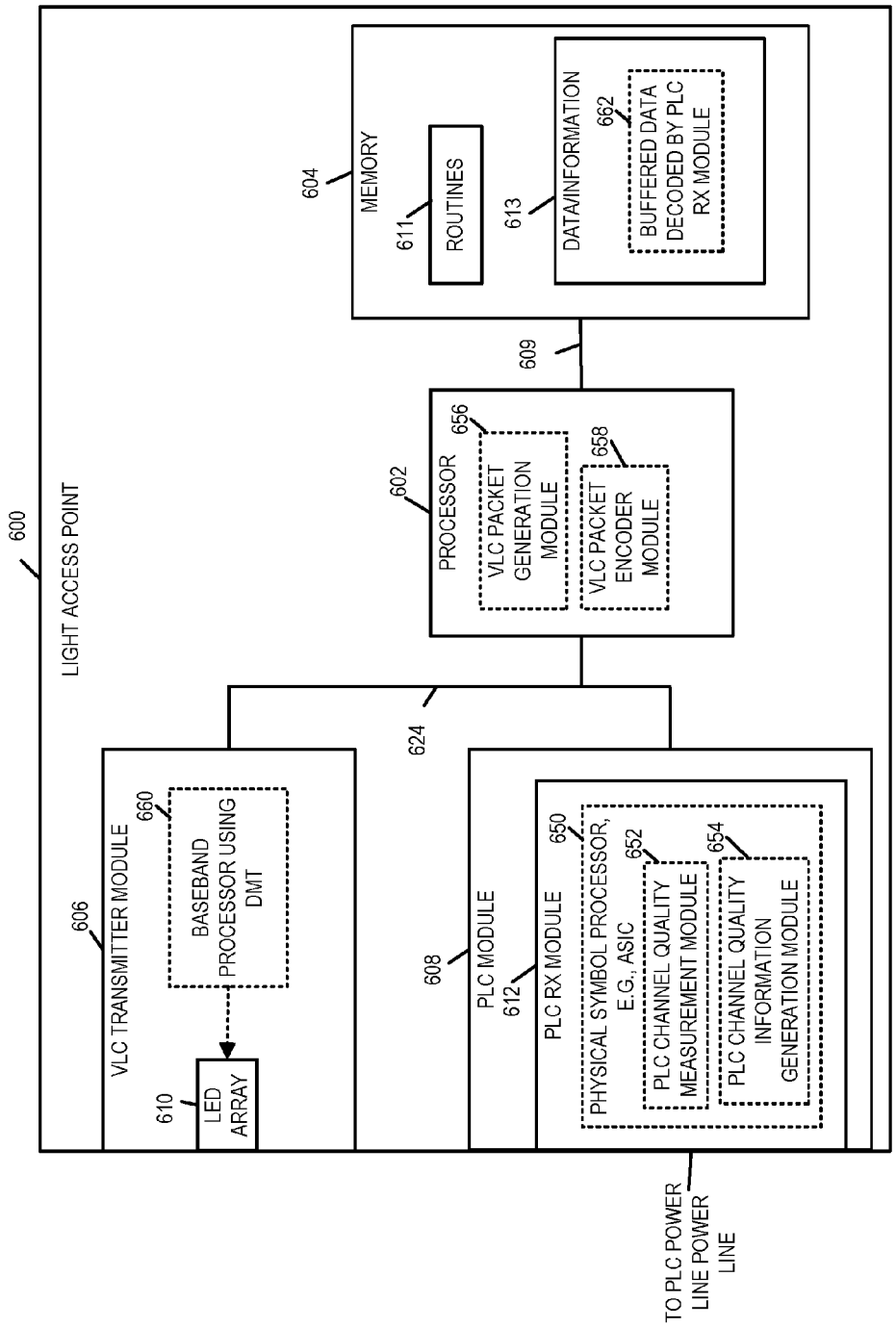
FIG. 6 is a drawing of an exemplary light access point in accordance with various exemplary embodiments.

FIG. 6 is a drawing of an exemplary light access point 600 in accordance with various exemplary embodiments. Light access point 600 is, e.g., one of the light access points (104, . . . , 106, 108, . . . , 110) of system 100 of FIG. 1 or light access point 1104 of system 1100 of FIG. 11. Light access point 600 may, and sometimes does, implement a method in accordance with flowchart 500 of FIG. 5. Light access point 600 includes a processor 602 and memory 604 coupled together via a bus 609 over which the various elements (602, 604) may interchange data and information. Memory 604 includes routines 611 and data/information 613. Light access point 600 further includes visible light communications (VLC) transmitter module 606, and a power line communications (PLC) module 608. The VLC module 606 and PLC module 608 are coupled to processor 602 via bus 624.

VLC module 606 includes an LED array 610 for transmitting VLC signals, e.g., VLC signals directed to a UE device.

PLC module 608 includes a PLC receiver module 612 for receiving PLC signals, e.g., PLC signals directed to light access point 600 from a PLC gateway device. PLC module 606 is connected to a power line. Received PLC signals include VLC channel feedback information.

In some embodiments, processor 602 is configured to: decode received encoded information to recover information to be communicated to a user equipment device; encode the recovered information as a function of light channel quality information to generate re-encoded information; and transmit the re-encoded information via a visible light communications (VLC) channel to the user equipment device.

In various embodiments, processor 602 is further configured to receive, via a power line communications (PLC) channel, said encoded information and said light channel quality information. In some embodiments, said light channel quality information includes per VLC modulation carrier SNR information; and processor 602 is further configured to select a code rate and/or a constellation size on a per modulation carrier basis based on the received modulation carrier SNR information (this is bit loading), as part of being configured to encode the recovered information.

In some embodiments, processor 602 is further configured to: select transmission power for at least some of said VLC modulation carriers based on said light channel quality information. In various embodiments, different power may be, and sometimes is, used for different VLC carriers. In some embodiments a lookup table or lookup tables are used to determine coding, modulation and/or carrier power on a per VLC carrier basis based on the received per carrier feedback information.

In some embodiments, processor 602 is configured to: perform a PLC channel quality measurement to generate PLC channel quality information; encode said PLC channel quality information; and transmit the encoded PLC channel quality information to the user device via said VLC channel. In some such embodiments, processor 602 is further configured to make an SNR measurement, as part of being configured to perform a PLC channel quality measurement. In some embodiments, said PLC channel quality information includes an SNR value or information which is a function of an SNR value.

In other embodiments, PLC receiver module 612 includes a physical symbol processor 650, e.g., an ASIC, and VLC transmitter module 606 includes a baseband processor 660 that generates a Discrete Multi-Tone (DMT) signal, sometimes referred to as an OFDM signal. In some such embodiments, physical symbol processor 650 includes a PLC channel quality measurement module 652 and a PLC channel quality information generation module 654; and processor 602 includes a VLC packet generation module 656 and a VLC packet encoder module 658. PLC channel quality measurement module 652 performs PLC channel quality measurements, and PLC channel quality information generation module 654 generates PLC channel quality information based on the measurement of module 652. The PLC channel quality measurement module 652, in some embodiments, measures PLC pilots and channel noise allowing for one or more SNR determinations to be made, e.g., on a per frequency basis. The PLC channel quality information, e.g., a report of PLC channel quality measurements such as pilot strength and/or SNR measurements, is communicated by module 654 to VLC packet generation module 656 of processor 602, which encodes the PLC channel quality information into VLC packets. VLC packet encoder module 658 encodes the VLC packets output from module 656 in accordance with transmission parameters selected based on the VLC channel quality information received in the PLC packets. The selected VLC parameters may reflect channel conditions and control the use of VLC modulation frequencies, e.g., with some VLC modulation frequencies being used with a higher coding rate and less redundancy and other VLC modulation frequencies communicating less data, e.g., data with a greater amount of redundancy, e.g., error correcting bits and/or communicating data using more resilient lower bit rate coding. In some embodiments, the selected VLC parameters specify which of a plurality of coding levels should be used for an individual frequency. In some such embodiments, at least some different coding levels correspond to different modulation symbol constellations. Output from VLC packet encoder module 658 is input to baseband processor 660. Baseband processor 660 uses DMT modulation but over different frequencies, e.g., with different bit-loading patterns corresponding to the coding and/or amount of redundancy used for the particular frequency. Thus, different amounts of data can be, and sometimes are, communicated over different VLC carriers based on the reported quality of the different VLC channels. Data/information 613 includes buffered data decoded by the PLC receiver module 612. Buffered data 662 includes VLC channel quality feedback information.

In some embodiments, a VLC channel is 30 MHz wide. In some embodiments, the number of VLC carriers is between 32 and 512 carriers, e.g., 32, 64, 128, 256, or 512, carriers depending on the particular embodiment. In some embodiments, a PLC channel is 30 MHz. In some such embodiments, a PLC channel includes notches. The notches correspond to portions of the PLC frequency band which are intentionally left unused or are used to a lesser extent, e.g., at a lower transmission power level, than other portions of the PLC frequency band used to communicate data over the power line. The notches are intentional and are intended to avoid or limit interference at particular frequencies. In some embodiments, the notches occur at predetermined frequencies with the frequency band used for PLC communications.

Figure 7:
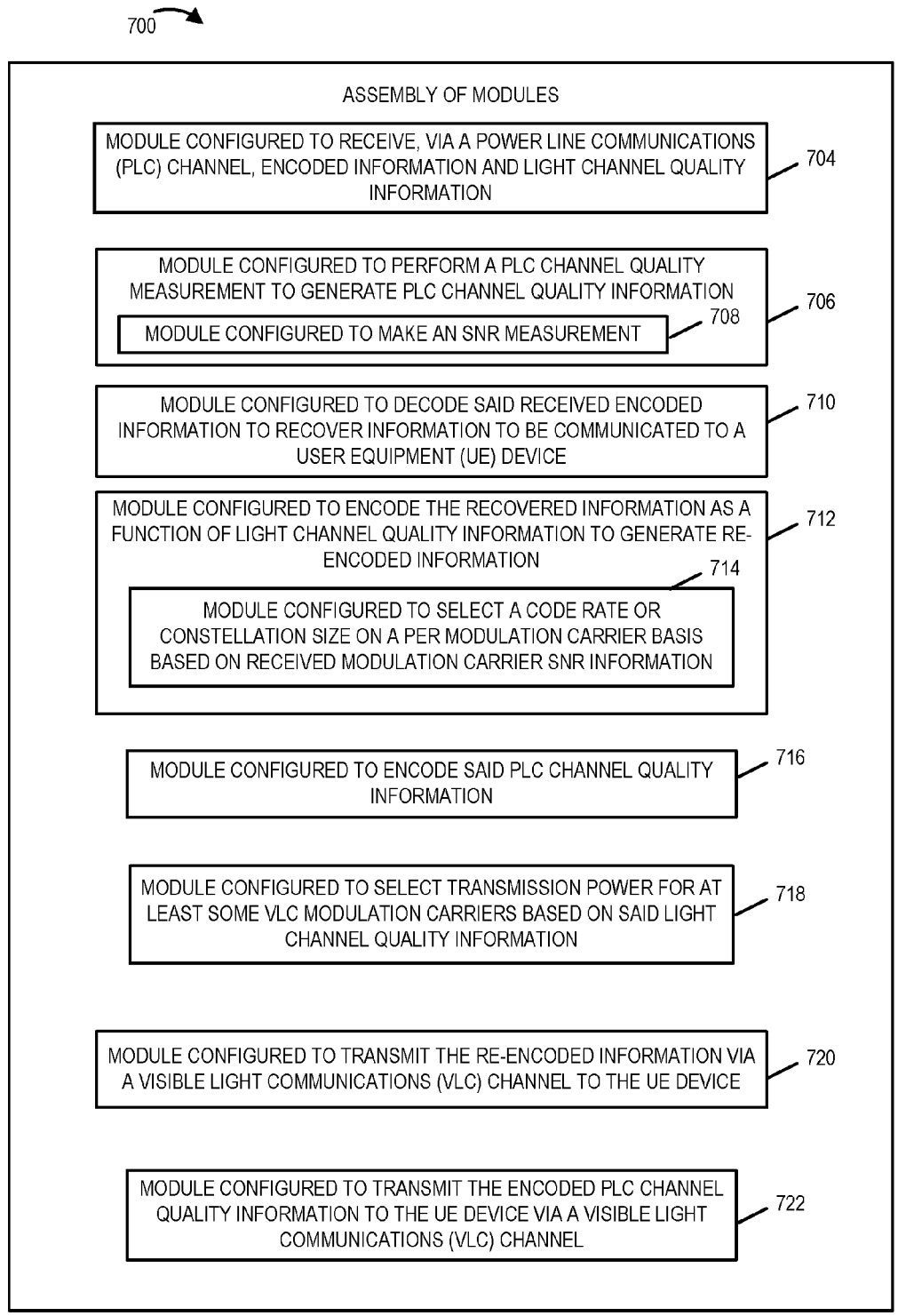
FIG. 7 is a drawing of an assembly of modules which may be included in the exemplary light access point of FIG. 6.

FIG. 7 is a drawing of an assembly of modules 700 in accordance with various exemplary embodiments. Assembly of modules 700 includes a module 704 configured to receive, via a power line communications (PLC) channel, encoded information and light channel quality information. In some embodiments, the light channel quality information includes per VLC modulation carrier SNR information.

Assembly of modules 700 further includes a module 706 configured to perform a PLC channel quality measurement to generate PLC channel quality information. Module 706 includes a module 708 configured to make an SNR measurement. In some embodiments, the PLC channel quality information includes an SNR value or information which is a function of an SNR value.

Assembly of modules 700 further includes a module 710 configured to decode said received encoded information to recover information to be communicated to a user equipment (UE) device, a module 712 configured to encode the recovered information as a function of light channel quality information to be communicated to a user equipment (UE) device, and a module 714 configured to select a code rate or constellation size for the light channel on a per modulation carrier basis based on received modulation carrier SNR information. In some embodiments, module 714 selects both a code rate and constellation size on a per modulation carrier basis based on received modulation carrier SNR information.

Assembly of modules 700 further includes a module 716 configured to encode said PLC channel quality information, and a module 718 configured to select transmission power for at least some VLC modulation carriers based on said light channel quality information. In some embodiments, different powers may be, and sometimes are used for different VLC carriers. In some embodiments, one or more lookup tables are used to determine coding, modulation, and carrier power on a per VLC carrier basis based on the received per carrier feedback information.

Assembly of modules 700 further includes a module 720 configured to transmit the re-encoded information via a visible light communications (VLC) channel to a UE device, and a module 722 configured to transmit the encoded PLC channel quality information to the UE device via a visible light communications (VLC) channel.

Figure 8:
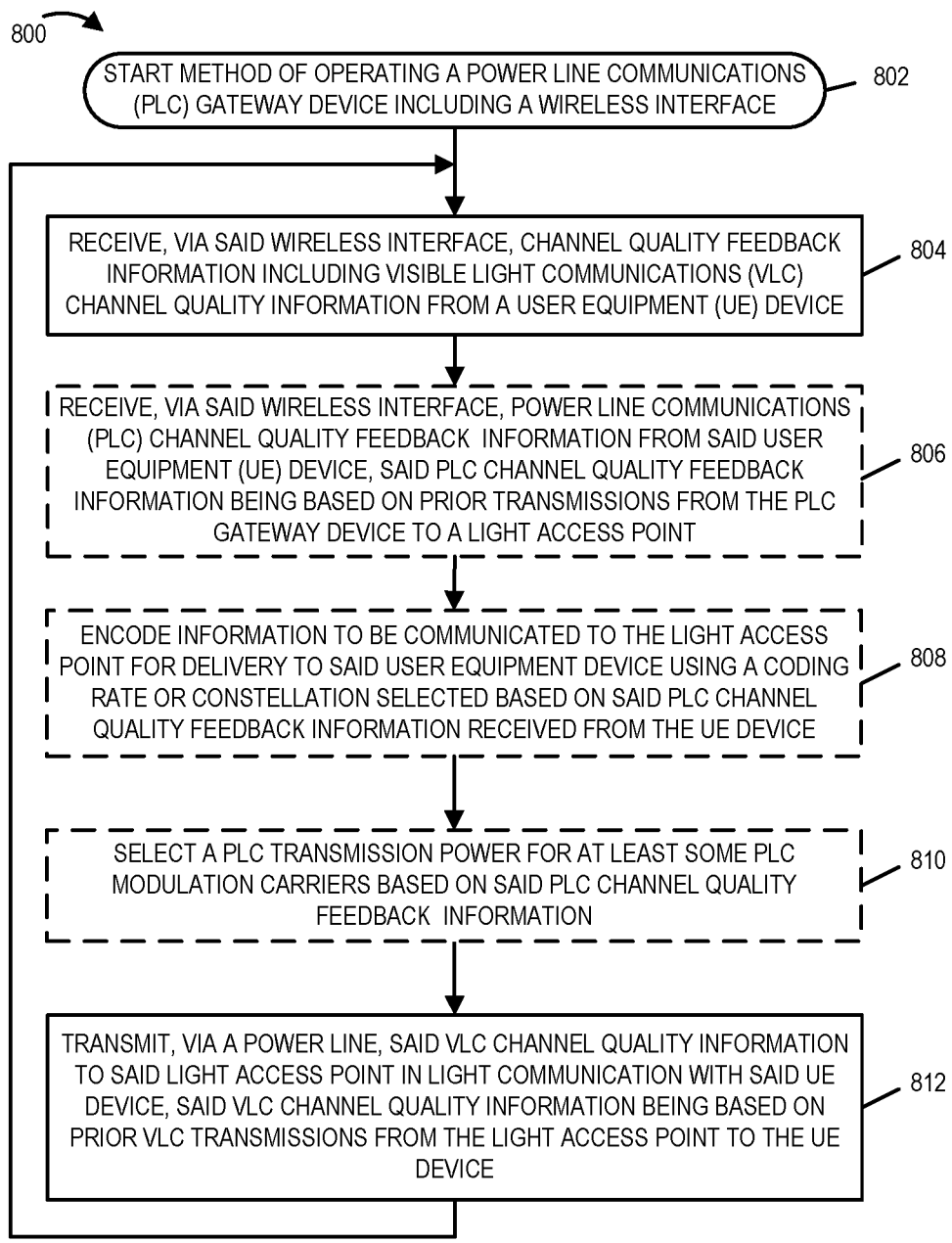
FIG. 8 is a flowchart of an exemplary method of operating a power line communications (PLC) gateway device including a wireless interface in accordance with various exemplary embodiments.

FIG. 8 is a flowchart 800 of an exemplary method of operating a power line communications (PLC) gateway device including a wireless interface in accordance with an exemplary embodiment. The PLC gateway device is, e.g., gateway device 102 of system 100 of FIG. 1 or gateway device 1102 of system 1100 of FIG. 11. Operation starts in step 802 in which the gateway device is powered on and initialized. Operation proceeds from step 802 to step 804. In step 804, the gateway device receives, via said wireless interface, quality feedback information including visible light communications (VLC) channel quality information from a user equipment (UE) device. In some embodiments, the VLC channel quality information includes per VLC modulation carrier SNR information. In some embodiments, operation proceeds from step 804 to step 812. In some other embodiments, operation proceeds from step 804 to step 806.

In step 806, the gateway device receives, via the wireless interface, power line communications (PLC) channel quality feedback information from said UE device, said PLC channel quality feedback information being based on prior PLC transmissions from the PLC gateway device to the light access point. In some embodiments, the PLC channel quality feedback information was received by the UE device from said light access point. In some such embodiments, the PLC channel quality feedback information includes an SNR value or information which is a function of an SNR value. In various embodiments, the power line communications channel quality feedback information includes power modulation carrier SNR information. Operation proceeds from step 806 to step 808. In step 808, the gateway device encodes information to be communicated to a light access point for delivery to said UE device using a coding rate or constellation based on the PLC channel quality information received from the UE device. In some embodiments, in step 808 the gateway device encodes information to be communicated to a light access point for delivery to said UE device using both a coding rate and a constellation based on the PLC channel quality information received from the UE device. Operation proceeds from step 808 to step 810, in which the gateway device selects a PLC transmission power for at least some PLC modulation carriers based on said PLC channel quality information. In some embodiments, different powers may be, and sometimes are, used for different PLC carriers. In some embodiments, a lookup table or lookup tables are used to determine one or more or all of coding, modulation, and carrier power on a per PLC carrier basis based on received per PLC carrier feedback information. Operation proceeds from step 810 to step 812.

In step 812 the gateway device transmits, via a power line, said VLC channel quality information to said light access point in communications with said UE device, said VLC channel quality information being based on prior VLC transmissions from the light access point to the UE device. Operation proceeds from step 812 to step 804.

Figure 9:
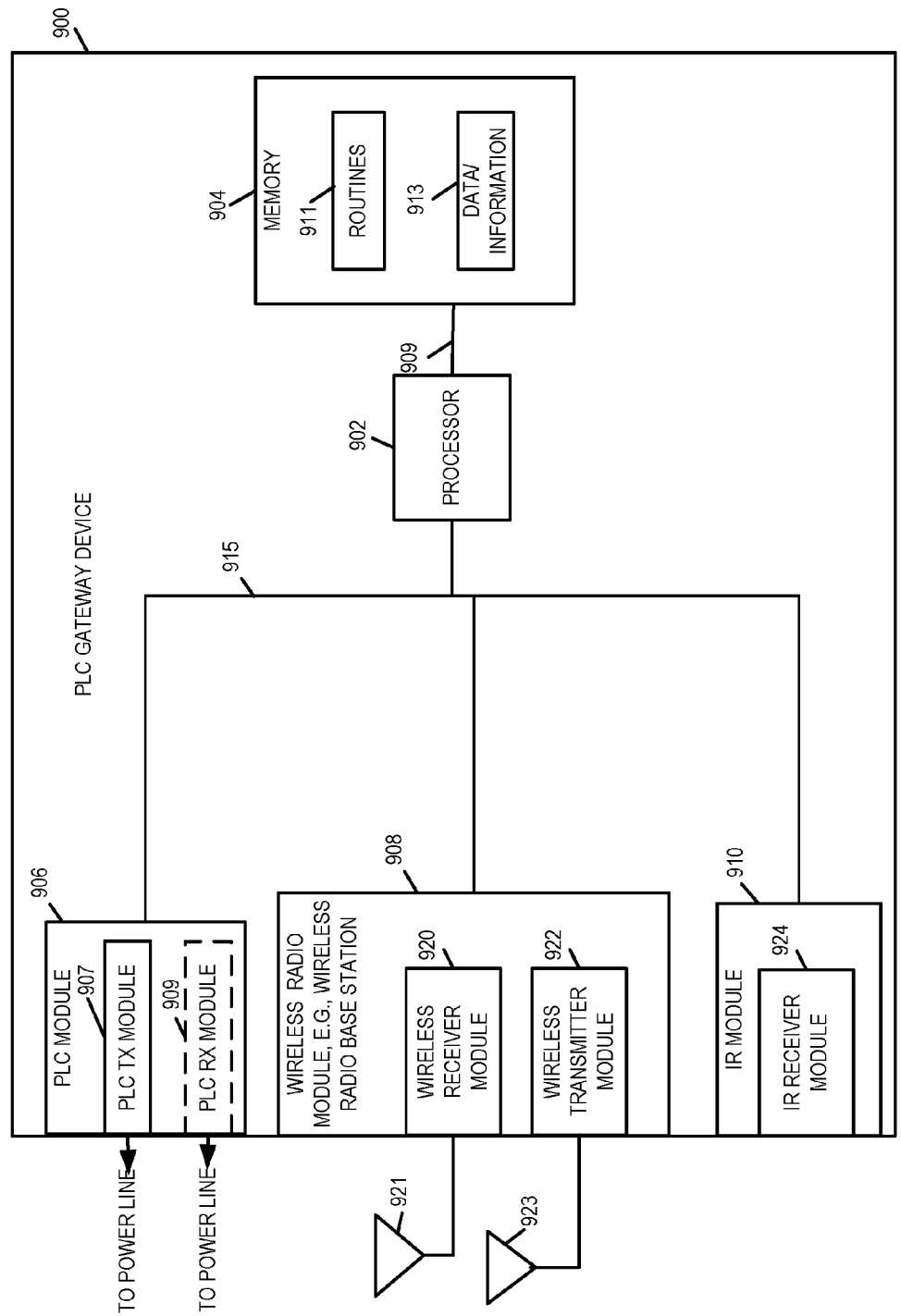
FIG. 9 is a drawing of an exemplary PLC gateway device including a wireless interface in accordance with various exemplary embodiments.

FIG. 9 is a drawing of an exemplary power line communications (PLC) gateway device 900 in accordance with an exemplary embodiment. PLC gateway device 900 is, e.g., PLC gateway device 102 of system 100 of FIG. 1 or gateways device 1102 of system 1100 of FIG. 11. PLC gateway device 900 may, and sometimes does, implement a method in accordance with flowchart 800 of FIG. 8. PLC gateway device 900 includes a processor 902 and memory 904 coupled together via a bus 909 over which the various elements (902, 904) may interchange data and information. Memory 904 includes routines 911 and data/information 913. PLC gateway 900 further includes a power line communications (PLC) module 906, a wireless radio module 908, e.g., a wireless radio base station, and an IR module 910. The PLC module 906, wireless radio module 908, and IR module 910 are coupled to processor 902 via bus 915. PLC module 906 includes a PLC transmitter module 907 for transmitting PLC signals, e.g., PLC signals directed to a VLC access point. PLC module 906 is connected to a power line. In some embodiments, PLC module 906 further includes a PLC receiver module 909 for receiving PLC signals, e.g., PLC signals directed from an intermediary device such as device 190 of FIG. 1, which is relaying channel quality feedback information from a UE device which was transmitted from the UE device via IR signaling.

Wireless radio module 908, e.g., a base station, includes a wireless receiver module 920, e.g., a WiFi receiver, coupled to receive antenna 921, via which gateway device 900 receives uplink radio signals from UE devices. In some embodiments, the uplink radio signals include channel quality feedback information corresponding to a VLC communications between a light access point and a UE device. In some such embodiments, the uplink radio signals further include channel quality feedback information corresponding to PLC communications between gateway device 900 and a light access point. Wireless radio module 908 further includes a wireless transmitter module 922, e.g., a WiFi transmitter, coupled to transmit antenna 923, via which gateway 900 transmits downlink radio signals to UE devices. In some embodiments, the same antenna is used for downlink and uplink.

IR module 910 includes an IR receiver module 924. In some embodiments, IR receiver module 924 receives uplink IR signals from UE devices. In some embodiments, the uplink IR signals include channel quality feedback information corresponding to a VLC communications between a light access point and a UE device. In some such embodiments, the uplink IR signals further include channel quality feedback information corresponding to PLC communications between gateway device 900 and a light access point.

In various embodiments, processor 902 is configured to: receive via a wireless interface (e.g., wireless radio module 908) channel quality feedback information including VLC channel quality information from a user equipment device; and transmit, via a power line (e.g., via PLC module 906), said VLC channel quality information to a light access point in light communication with said UE device, said VLC channel quality information being based on prior VLC transmissions from the light access point to the UE device. In some such embodiments, said VLC channel quality information includes per VLC modulation carrier SNR information.

In some embodiments, processor 902 is further configured to: receive, via said wireless interface, power line communications (PLC) channel quality feedback information from said UE device, said PLC channel quality feedback information being based on prior PLC transmissions from the PLC gateway device to the light access point. In some such embodiments, said power line channel quality feedback information was received by said UE device from said light access point. In some such embodiments, said power line channel quality feedback information includes an SNR value or information which is a function of an SNR value. In various embodiments, said power line channel quality feedback information includes per modulation carrier SNR information.

In some embodiments, processor 902 is further configured to: encode information to be communicated to said light access point for delivery to said user device using a code rate and/or constellation selected based on PLC channel quality information received from said user equipment device. In some such embodiments, processor 902 is further configured to: select a PLC transmission power for at some PLC modulation carriers based on said channel quality information. In various embodiments, different power may be, and sometimes is, used for different PLC carriers, e.g., based on received PLC channel quality feedback information. In some embodiments a lookup table or lookup tables are used to determine one or more or all of: coding, modulation and carrier power on a per PLC carrier basis based on the received per carrier feedback information.

Figure 10:
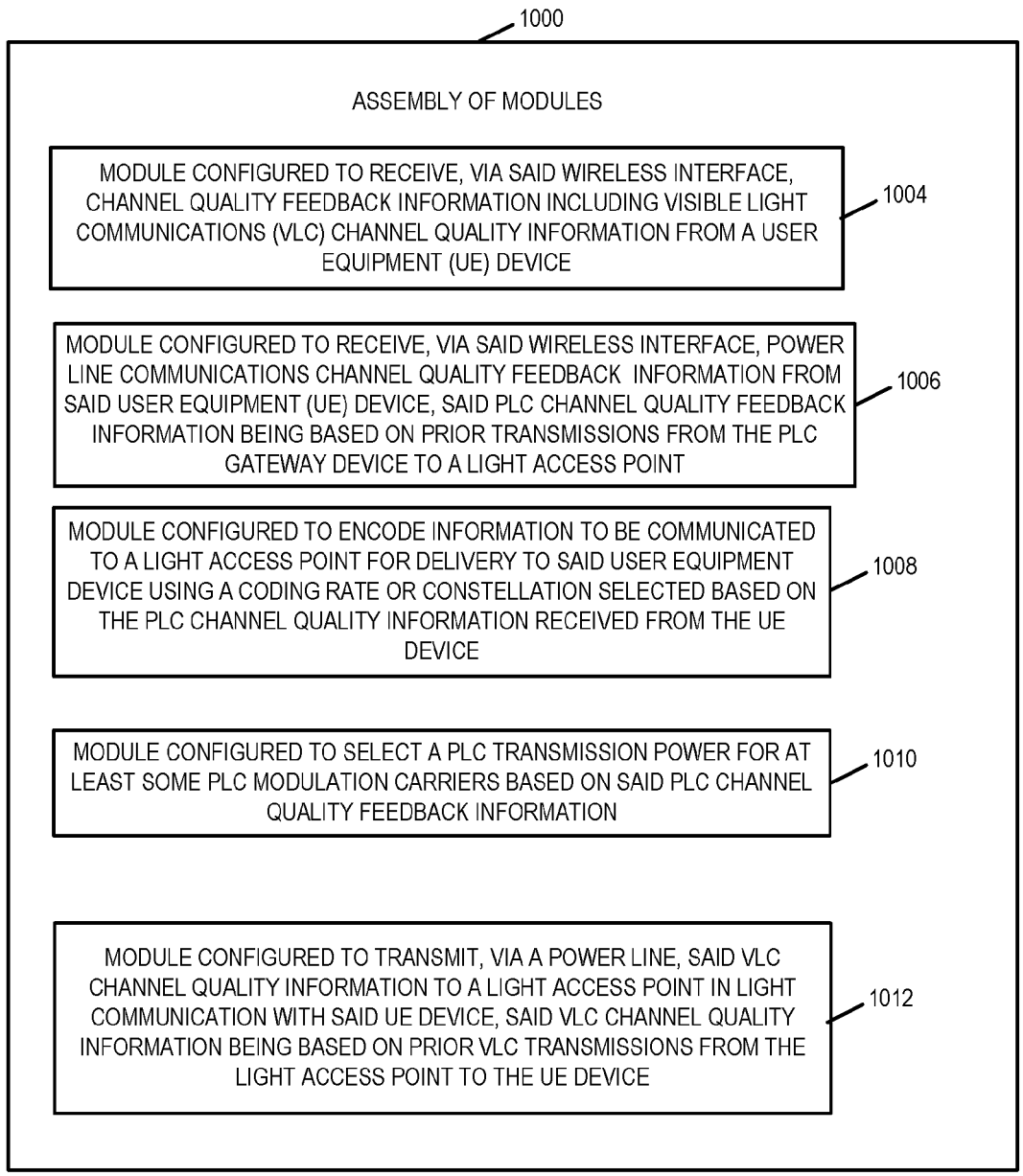
FIG. 10 is a drawing of an assembly of modules which may be included in the exemplary PLC gateway device including a wireless interface of FIG. 9.

Referring to FIG. 10, assembly of modules 1000 includes a module 1004 configured to receive, via a wireless interface, channel quality feedback information including visible light communications (VLC) channel quality information from a user equipment (UE) device, a module 1006 configured to receive, via said wireless interface, power line communications (PLC) channel quality feedback information from said UE device, said PLC channel quality feedback information being based on prior PLC transmissions from the PLC gateway device to the light access point, a module 1008 configured to encode information to be communicated to a light access point for delivery to said UE device using a coding rate or constellation selected based on the PLC channel quality feedback information received from the UE device, a module 1010 configured to select a PLC transmission power for at least some PLC modulation carries based on said PLC channel quality feedback information, and a module 1012 configured to transmit, via a power line, said VLC channel quality information to a light access point in communication with said UE device, said VLC channel quality information being based on prior VLC transmissions from the light access point to the UE device.

Figure 11:
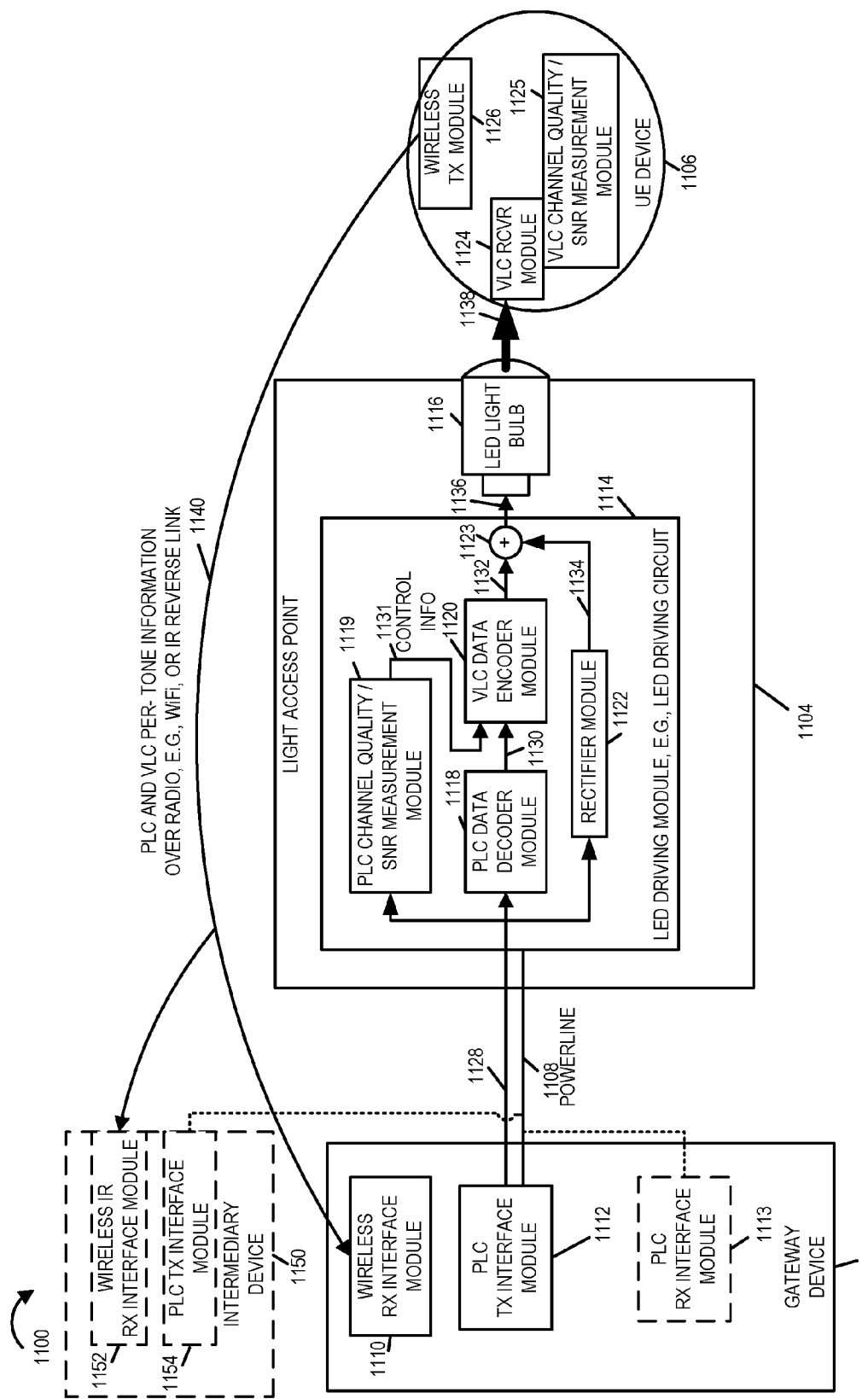
FIG. 11 is a drawing of an exemplary communications system in accordance with an exemplary embodiment.

Various aspects and/or features of some, but not necessarily all, embodiments are further discussed below. FIG. 11 illustrates an exemplary communications system 1100 in accordance with some embodiments. Exemplary system 1100 includes the following components: a gateway device 1102, a light access point 1104, and a user equipment device 1106. Gateway device 1102 includes a PLC transmitter interface module 1112 and a wireless receiver interface module 1110. The gateway device 1102, e.g., a Hy-Fi gateway, transmits Powerline Communication (PLC) signals to the light access point 1104 and receives wireless signals, e.g., wireless radio signals such as Wi-Fi signals or wireless IR signals, from the UE device 1106.

Light access point 1104 includes an LED driving module 1114, e.g., an LED driving circuit, and an LED light bulb 1116 coupled together. LED light bulb 1116 performs two functions. LED light bulb 1116 communicates data to UE 1106, and LED light bulb 1116 provides visible light to illuminate all or a portion of a room in a similar way that a conventional light bulb lights a room or a portion of a room. In some embodiments, the light access point 1104 includes a processor and memory. In some embodiments, the LED driving module 1114 includes a processor and memory. The light access point 1104, e.g., a Lumicast AP, implements a PLC to VLC (visible light communication) signal conversion and transmits VLC signals to the UE device 1106. Light access point 1104 further performs PLC channel quality measurements including SNR measurements, e.g., on a per PLC frequency, e.g., per PLC tone basis.

Light driving module 1114 includes a PLC data decoder module 1118, a PLC channel quality measurement/SNR measurement module 1119, a VLC data encoder module 1120, a rectifier module 1122 and a summer module 1123. Input signals 1128 received over power line 1108 include encoded PLC communications signals. PLC data decoder module 1118 decodes the received PLC communications signals, recovering information 1130, which is forwarded to VLC data encoder module 1120. Recovered information 1130 includes, e.g., traffic data to be communicated via a VLC downlink to UE device 1106, and VLC feedback channel quality information, e.g., on a per VLC frequency basis, e.g., per VLC tone basis, which is used by VLC encoder module as control information to control VLC encoder module 1120 to encode data to be communicated via VLC communications. In some embodiments, the VLC data encoder module 1120 selects one or more or all of: VLC frequencies, e.g., VLC tones, to be used, transmission power levels, data coding rates, and modulation constellations, e.g., on a per VLC frequency, e.g., per VLC tone basis, based on the received VLC feedback information communicated to module 1120 in signals 1130. The VLC feedback information may be based on measurements made by UE 1106 of a previous communication between light access point 1104 and UE 1106 via a light channel extending between LED 1116 and UE 1106.

PLC channel quality/SNR measurement module 1119 measures the PLC signals received from gateway device 1102, generates one or more SNRs, e.g., an individual SNR for each PLC frequency, e.g., PLC tone, being monitored and generates PLC channel quality feedback information 1131, e.g., SNR reports corresponding to individual PLC frequency, e.g., tone, and forwards the generated PLC channel quality feedback information, which is control information, to the VLC data encoder module 1120. The PLC channel quality information is intended to be communicated to the gateway device 1102, via the UE device 1106, and to be used by the gateway device 1102 to control its PLC transmitter module 1112 with regard to PLC signal transmissions to LED access point 1104.

The VLC encoder module 1120 encodes the PLC channel quality information 1131. Output 1132 of VLC data encoder module includes, e.g., traffic data signals intended for UE device 1106, VLC pilot signals intended to be used to measure the light channel between light access point 1104 and UE device 1106, and PLC quality channel feedback information intended for gateway device 1102.

Rectifier module 1122 receives an AC power signal from power line 1108, and rectifies the signal producing an output signal 1134 having a DC average value. Summing module 1123 combines the DC power signal 1134 with the generated encoded signals 1132, and outputs combined LED driving signals 1136. Combined signals 1136 are fed as input to LED light light bulb 1116 to drive the LED light bulb 1116. LED light bulb 1116 generates light signals 113 8 including VLC communications signals conveying traffic data intended for UE device 1106 and PLC channel quality feedback information, e.g., SNR feedback reports, intended for gateway device 1102.

The UE device 1106, e.g., a mobile node, receives, via VLC receiver module 1124, VLC signals included in light signals 1138. Light signals 1138 also include light pilot signals. UE device 1106 further includes a VLC channel quality/SNR measurement module 1125 which measures the VLC channel quality between light access point 1104 and UE device 1106, e.g., performing SNR measurements on a per VLC frequency, e.g., per VLC tone, basis and generating VLC feed feedback info, e.g., VLC channel quality feedback reports including SNR information on a per VLC frequency, e.g., per VLC tone, basis. UE device 1106 transmit, via wireless transmit module 1126 wireless signals 1140 to the gateway device 1102, e.g., using an out-of-band technology such as radio wireless signaling, e.g., Wi-Fi signaling or wireless IR signaling. Signals 1140 include PLC and VLC channel quality feedback information, e.g., on a per PLC frequency, e.g., PLC tone, basis, and on a per VLC frequency, e.g., per VLC tone, basis.

One advantageous feature of various embodiments is that the light AP 1104, e.g., a Lumicast AP, does not have a PLC transmitter to communicate with the gateway device, e.g., the Hy-Fi gateway. This intentional omission of a PLC transmitter in the light access point 1104 reduces the cost of the light AP 1104. The reverse link is established via wireless, e.g., wireless radio such as Wi-Fi, or wireless IR. In various embodiments, the connection setup and channel feedback occurs over this reverse link. Another advantageous feature of some embodiments, is that the light access point 1104, e.g., a Lumicast AP, adapts, e.g., optimally adapts, to the VLC channel conditions, and the light access point 1104 implements a function to allow the gateway device, e.g., a Hy-Fi gateway, to adapt, e.g., optimally adapt, to the PLC channel conditions without a direct reverse link (e.g., a direct reverse link PLC channel from light access point 1104 to gateway device 1102) to the gateway. In some embodiments, both the PLC and VLC channels are frequency-selective. In some embodiments, OFDM is the modulation method. In various embodiments, the channels do not vary fast in time so bit-loading, sometimes referred to as waterfilling, can be, and in various embodiments is, performed without significant overhead.

FIG. 11 illustrates a joint PLC and VLC system 1100 using an out-of-band wireless reverse link, e.g., a radio, e.g., Wi-Fi reverse link, or an IR reverse link. Wireless TX module 1126 of UE device 1106 and wireless receiver module 1110 of gateway device 1102 are, e.g., wireless radio WiFi modules or IR modules.

The light access point 1104, e.g., a Lumicast AP, is connected to the power line 1108 on the receiving side, and the LED lamp 1116 on the transmit side transmits light signals. The LED access point 1104 performs the following operations. The LED access point 1104 demodulates and decodes, e.g., via module 1118, the traffic data and control signals from the PLC line. The traffic data is intended for the UE device 1106. The control signal carries per-tone SNR information of the VLC link between the light AP 1104, e.g., Lumicast AP, and the UE device 1106. This information is provided by the channel estimation performed by the UE device 1106 and fed back over the reverse link, e.g., wireless radio reverse link such as a Wi-Fi reverse link or wireless IR reverse link.

The light access point 1104 encodes and modulates, e.g., via module 1120, the traffic data decoded by the PLC decoder to an analog VLC signal that drives the LED. In various embodiments, the VLC data encoder module 1120 implements a bit-loading algorithm which determines the size of the constellation and transmit power on each of the tones of the VLC signal. In some embodiments, the bit-loading is performed in order to optimize the rate on the VLC link. The input to the bit-loading algorithm comes from the VLC tone SNR information decoded from the PLC line in the described step above.

The light access point 1104 performs PLC channel estimation and PLC tone SNR measurement, e.g., via module 1119, using PLC pilot signals, generating control information 1131. The SNR measurements corresponding to the PLC communications channel are encoded, by module 1120, and sent via the VLC signals to the UE device 1106. This PLC channel quality information will be fed back by the UE device 1106 over the wireless reverse link, e.g., radio wireless link such as a Wi-Fi link or an IR link, and used by the gateway, e.g., a Hy-Fi gateway, to perform bit-loading of the transmitted PLC signal so as to optimize the rate on the PLC link.

The exemplary system 1100 uses Power-line Communications (PLC) to deliver the data from the gateway device 1102 to the light access point 1104. In various embodiments, the light access point 1104 includes PLC digital receive capability, e.g., including a PLC digital receiver, PLC data decoder module 1118 and PLC channel quality measurement module 1119, and a visible light output capability, e.g., a VLC transmitter module including VLC data encoder module 1120, summer module 1123, rectifier module 1122 and LED light bulb 1116. The UE device 1106 includes an optical front-end including VLC receiver module 1124.

For the reverse link, there are various wireless communications options including these three exemplary options. In a first exemplary option, built-in wireless radio capability, e.g., WiFi, in the user equipment device 1106 and the gateway device 1102, e.g., a Hybrid gateway, is implemented and used. In one such example, the wireless radio interfaces (1110, 1126) implement an IEEE 1905.1 standard, e.g., the Atheros Hy-Fi. In a second exemplary option, an infrared transmitter in wireless transmitter module 1126 of UE device 1106 and an IR receiver in wireless receiver module 1110, e.g., including a photodiode, of gateway device 1102 are implemented and used. Output information received from the wireless receiver module 1110 is communicated to the PLC module 1112 of the gateway device 1102.

In a third exemplary option, an infrared transmitter is included in wireless transmitter module 1126 of UE device 1106; an intermediary device 1150 including an IR receiver 1152 and a PLC transmitter 1154 is included in system 1100 and is used to receive IR signals from the UE device 1106, convert information communicated in the IR signals to PLC signals and communicate the information, via PLC signal transmissions from module 1154 to a PLC receiver 1113 included in gateway device 1102 via power line 1108.

In some embodiments, a gateway device, e.g., a gateway device implementing a method in accordance with an exemplary embodiment, includes a combination of elements in included in any of one or more or all of gateway device 102, gateway device 1102, gateway device 900, and assembly of modules 1000. In some embodiments, a light access point, e.g., a light access point implementing a method in accordance with an exemplary embodiment, includes a combination of elements included in any of one or more or all of light access point 104, light access point 108, light access point 1104, light access point 600, and assembly of modules 700. In some embodiments, a UE device, e.g., a UE device implementing a method in accordance with an exemplary embodiment, includes a combination of elements included in any of one or more or all of UE device 114, UE device! 18, UE device 1106, UE device 300, and assembly of modules 400.

In various embodiments, a device of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

In some embodiments, a light modulation carrier, e.g., a VLC light carrier, refers to a VLC tone. In some embodiments, a PLC modulation carrier or PLC carrier refers to PLC tone.

The techniques of various embodiments may be implemented using software, hardware and/or a combination of software and hardware. Various embodiments are directed to apparatus, e.g., gateways including base stations, e.g., Wi-Fi base stations, and including PLC transmit capability, user equipment devices such as stationary nodes and/or mobile nodes such as stationary or mobile terminals supporting wireless radio transmit and receive communications capability and/or IR transmit capability, and VLC receive capability, light access points such as VLC access points including an LED or LEDs which include a PLC receive capability, access points such as base stations, PLC interface devices, IR to PLC conversions devices and/or communications systems. Various embodiments are also directed to methods, e.g., method of controlling and/or operating UE stationary nodes, UE mobile nodes, light access points such as, e.g., a VLC access point including a PLC receive capability and a VLC transmit capability, gateways such as, e.g., a gateway device including a PLC transmit capability and a wireless, e.g., wireless radio and/or wireless IR receive capability, network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as wireless terminals, network nodes, and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments, are well suited for communications systems supporting PLC communications, VLC communications and wireless communications. Various embodiments are well suited to communications systems using a PLC, VLC, WiFi, and/or IR signaling protocol. Some embodiments are well suited for use with PLC gateway devices including base stations. Some embodiments are well suited for use with peer to peer signaling protocols. Some embodiments use an Orthogonal Frequency Division Multiplexing (OFDM) based wireless signaling protocol, e.g., WiFi signaling protocol or another OFDM based protocol. Some embodiments use a VLC signaling protocol using VLC tones. Various embodiments are well suited for communications in indoor environments.

While described in the context of an OFDM system, at least some of the methods and apparatus of various embodiments are applicable to a wide range of communications systems including many non-OFDM and/or non-cellular systems. Numerous additional variations on the methods and apparatus of the various embodiments described above will be apparent to those skilled in the art in view of the above description. Such variations are to be considered within the scope. The methods and apparatus may be, and in various embodiments are, used with WiFi, LTE, Code Division Multiple Access (CDMA), OFDM, TDM, and/or various other types of communications techniques which may be used to provide wireless communications links between communications devices. In some embodiments one or more communications devices are implemented as access points which establish communications links with mobile nodes using VLC, WiFi, LTE, OFDM and/or CDMA and/or may provide connectivity to the internet or another network via a wired or wireless communications link. In some embodiments, a wireless communications device, e.g., a mobile node, which implements a method, is embedded in a vehicle. In various embodiments the mobile nodes are implemented as notebook computers, personal data assistants (PDAs), or other portable devices including receiver/transmitter circuits and logic and/or routines, for implementing the methods.

What is claimed is:

1. A method of operating a power line communications (PLC) gateway device including a wireless interface, comprising:
    receiving, via said wireless interface, feedback information including visible light communication (VLC) channel quality information from a user equipment (UE) device and a suggested modulation or a suggested coding rate to be used by a light access point during future VLC transmissions; and
    transmitting, via a power line, said feedback information to said light access point in light communication with said UE device, said feedback information based at least in part on prior VLC transmissions from the light access point to the UE device.

2. The method of claim 1, wherein said VLC channel quality information includes per VLC modulation carrier signal to noise ratio (SNR) information.

3. The method of claim 1, further comprising:
    receiving, via said wireless interface, PLC channel quality feedback information from said UE device, said PLC channel quality feedback information based at least in part on prior PLC transmissions from the PLC gateway device to the light access point.

4. The method of claim 3, wherein said PLC channel quality feedback information was received by said UE device from said light access point.

5. The method of claim 4, wherein said PLC channel quality feedback information includes a signal to noise ratio (SNR) value or information which is based at least in part on an SNR value.

6. A power line communications (PLC) gateway device including a wireless interface, the PLC gateway device comprising:
    means for receiving, via said wireless interface, feedback information including visible light communications (VLC) channel quality information from a user equipment (UE) device and a suggested modulation or a suggested coding rate to be used by a light access point during future VLC transmissions; and
    means for transmitting, via a power line, said feedback information to said light access point in light communication with said UE device, said feedback information being based at least in part on prior VLC transmissions from the light access point to the UE device.

7. The PLC gateway device of claim 6, wherein said VLC channel quality information includes per VLC modulation carrier signal to noise ratio (SNR) information.

8. The PLC gateway device of claim 6, further comprising:
    means for receiving, via said wireless interface, PLC channel quality feedback information from said UE device, said PLC channel quality feedback information based at least in part on prior PLC transmissions from the PLC gateway device to the light access point.

9. The PLC gateway device of claim 8, wherein said PLC channel quality feedback information was received by said UE device from said light access point.

10. The PLC gateway device of claim 9, wherein said PLC channel quality feedback information includes a signal to noise ratio (SNR) value or information which is based at least in part on an SNR value.

11. A computer program product for use in a power line communications (PLC) gateway device including a wireless interface, the computer program product comprising:
 a non-transitory computer readable medium comprising:
 code for causing at least one computer to receive, via said wireless interface, feedback information including visible light communication (VLC) channel quality information from a user equipment (UE) device and a suggested modulation or a suggested coding rate to be used by a light access point during future VLC transmissions; and
 code for causing said at least one computer to transmit, via a power line, said feedback information to a light access point in light communication with said UE device, said feedback information being based at least in part on prior VLC transmissions from the light access point to the UE device.

12. The computer program product of claim 11, wherein said VLC channel quality information includes per VLC modulation carrier signal to noise ratio (SNR) information.

13. The computer program product of claim 11, wherein the non-transitory computer readable medium further comprises:
 code for receiving, via said wireless interface, PLC channel quality feedback information from said UE device, said PLC channel quality feedback information based at least in part on prior PLC transmissions from the PLC gateway device to the light access point.

14. The computer program product of claim 13, wherein said PLC channel quality feedback information was received by said UE device from said light access point.

15. The computer program product of claim 14, wherein said power line communications channel quality feedback information includes a signal to noise ratio (SNR) value or information which is based at least in part on an SNR value.

16. A power line communications (PLC) gateway device including a wireless interface, the PLC gateway device comprising:
 at least one processor configured to:
 receive, via said wireless interface, channel quality feedback information including visible light communications (VLC) channel quality information from a user equipment (UE) device and a suggested modulation or a suggested coding rate to be used by a light access point during future VLC transmissions; and
 transmit, via a power line, said feedback information to said light access point in light communication with said UE device, said feedback information being based at least in part on prior VLC transmissions from the light access point to the UE device; and
 memory coupled to said at least one processor.

17. The PLC gateway device of claim 16, wherein said VLC channel quality information includes per VLC modulation carrier signal to noise ratio (SNR) information.

18. The PLC gateway device of claim 16, wherein said at least one processor is further configured to:
 receive, via said wireless interface, PLC channel quality feedback information from said UE device, said PLC channel quality feedback information based at least in part on prior PLC transmissions from the PLC gateway device to the light access point.

19. The PLC gateway device of claim 18, wherein said PLC channel quality feedback information was received by said UE device from said light access point.

20. The PLC gateway device of claim 19, wherein said PLC channel quality feedback information includes an signal to noise ratio (SNR) value or information which is based at least in part on an SNR value.

\* \* \* \* \*